US011639904B2

(12) United States Patent
Ohbayashi et al.

(10) Patent No.: US 11,639,904 B2
(45) Date of Patent: May 2, 2023

(54) INSPECTION DEVICE, INSPECTION METHOD, AND METHOD FOR PRODUCING OBJECT TO BE INSPECTED

(71) Applicant: NIKON CORPORATION, Tokyo (JP)

(72) Inventors: Takeshi Ohbayashi, Yokohama (JP); Masayuki Zaike, Fujisawa (JP); Takahiro Michimoto, Yokohama (JP)

(73) Assignee: Nikon Corporation, Tokyo (JP)

( * ) Notice: Subject to any disclaimer, the term of this patent is extended or adjusted under 35 U.S.C. 154(b) by 14 days.

(21) Appl. No.: 16/607,657

(22) PCT Filed: Apr. 26, 2017

(86) PCT No.: PCT/JP2017/016604
§ 371 (c)(1),
(2) Date: Oct. 23, 2019

(87) PCT Pub. No.: WO2018/198242
PCT Pub. Date: Nov. 1, 2018

(65) Prior Publication Data
US 2020/0300784 A1 Sep. 24, 2020

(51) Int. Cl.
G01N 23/046 (2018.01)
G01N 23/083 (2018.01)

(52) U.S. Cl.
CPC ......... *G01N 23/046* (2013.01); *G01N 23/083* (2013.01); *G01N 2223/04* (2013.01);
(Continued)

(58) Field of Classification Search
None
See application file for complete search history.

(56) References Cited

U.S. PATENT DOCUMENTS 7,106,827 B2   9/2006  Heuft et al.
10,539,517 B2* 1/2020  Kashu .................. G01N 23/083
(Continued)

FOREIGN PATENT DOCUMENTS

JP   2003-021609 A   1/2003
JP   2006-505787 A   2/2006
(Continued)

OTHER PUBLICATIONS

International Search Report dated Aug. 1, 2017, in the corresponding PCT International Application.
(Continued)

*Primary Examiner* — Thomas R Artman
(74) *Attorney, Agent, or Firm* — Finnegan, Henderson, Farabow, Garrett & Dunner, L.L.P.

(57) ABSTRACT

An inspection device includes a ray source that irradiates an object to be inspected with energy rays, a detection unit that detects energy rays that have passed through the object to be inspected, a displacement mechanism that sets a relative position of the object to be inspected and the ray source by displacing at least one of the object to be inspected and the ray source in relation to the other, an internal image generation unit that generates an internal image of the object to be inspected based on a detection amount distribution of the energy rays detected by the detection unit, and a control unit that controls the displacement mechanism based on the detection amount distribution of the energy rays detected by the detection unit.

19 Claims, 10 Drawing Sheets

(52) U.S. Cl.
CPC .............. *G01N 2223/321* (2013.01); *G01N 2223/3305* (2013.01); *G01N 2223/3306* (2013.01); *G01N 2223/3307* (2013.01); *G01N 2223/3308* (2013.01); *G01N 2223/401* (2013.01); *G01N 2223/41* (2013.01); *G01N 2223/419* (2013.01); *G01N 2223/426* (2013.01); *G01N 2223/645* (2013.01); *G01N 2223/6466* (2013.01)

(56) References Cited

U.S. PATENT DOCUMENTS

| | | | | |
|---|---|---|---|---|
| 10,732,125 | B2* | 8/2020 | Shinomiya | ............ H01M 10/48 |
| 10,811,652 | B2* | 10/2020 | Shinomiya | ............ B65H 21/00 |
| 10,852,254 | B2* | 12/2020 | Kashu | .................... G01N 23/04 |
| 2009/0268869 | A1 | 10/2009 | Hadland | |
| 2010/0118027 | A1* | 5/2010 | Weiss | .................... A61B 6/032 |
| | | | | 345/419 |
| 2013/0083896 | A1 | 4/2013 | Watanabe | |
| 2018/0149602 | A1 | 5/2018 | Shinomiya et al. | |
| 2018/0159102 | A1* | 6/2018 | Shinomiya | ............ B65H 26/00 |
| 2019/0079030 | A1* | 3/2019 | Kashu | .................... G01N 23/18 |
| 2019/0302035 | A1* | 10/2019 | Kashu | .................... G01V 5/0016 |
| 2020/0300784 | A1* | 9/2020 | Ohbayashi | ........... G01N 23/083 |
| 2021/0003518 | A1* | 1/2021 | Sugiyama | ............ G01N 23/083 |

FOREIGN PATENT DOCUMENTS

| | | | | |
|---|---|---|---|---|
| JP | 2013-137287 | | 7/2013 | |
| JP | 2015-075336 A | | 4/2015 | |
| JP | 2015-083932 A | | 4/2015 | |
| JP | 2018091825 A | * | 6/2018 | ........... B65B 25/146 |
| JP | 2018092890 A | * | 6/2018 | ........... B65B 25/146 |
| WO | WO 2016/181508 A1 | | 11/2016 | |

OTHER PUBLICATIONS

International Search Report dated Aug. 29, 2019, in the corresponding PCT International Application.

Chinese Office Action dated Oct. 25, 2021 issued by The Patent Office of the People's Republic of China in Chinese Application No. 201780090043.5, and English language translation thereof.

Chinese Office Action dated Mar. 22, 2022 issued by The Patent Office of the People's Republic of China, in Chinese Application No. 2017800900435, and English language translation thereof.

* cited by examiner

FIG.3
(a)
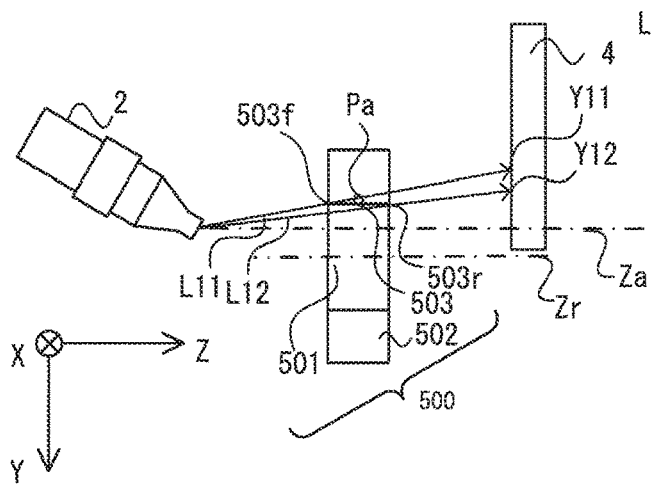
(b)
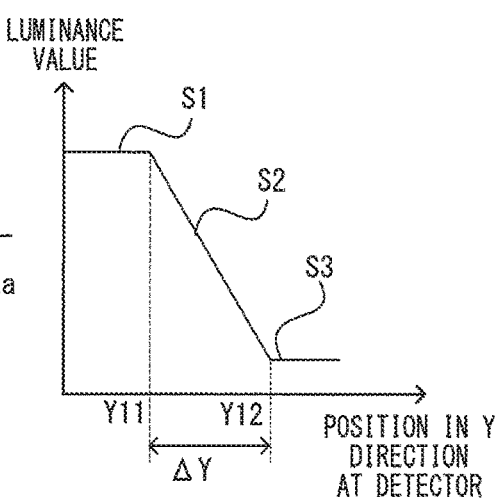
(c)
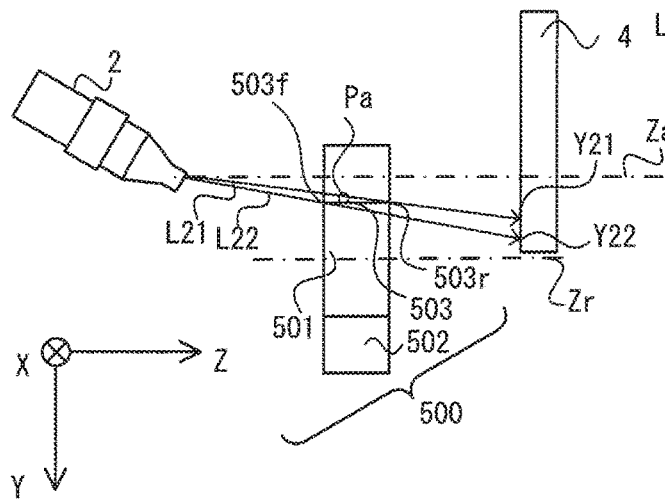
(d)
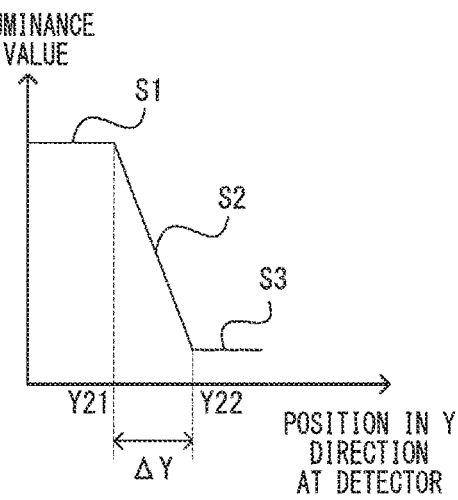
(e)
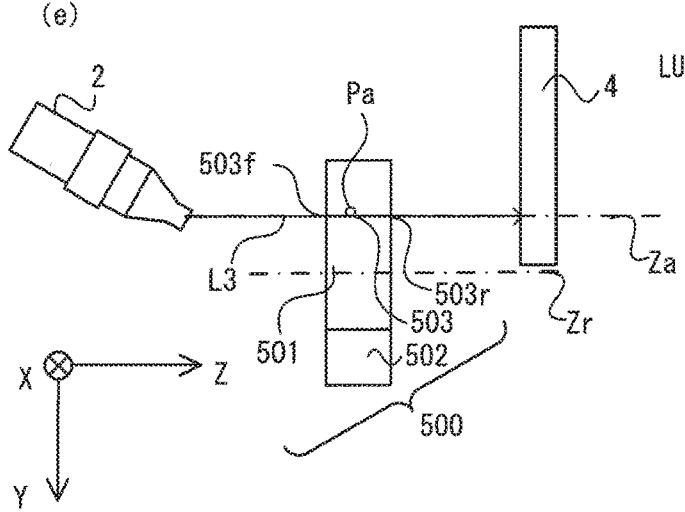
(f)
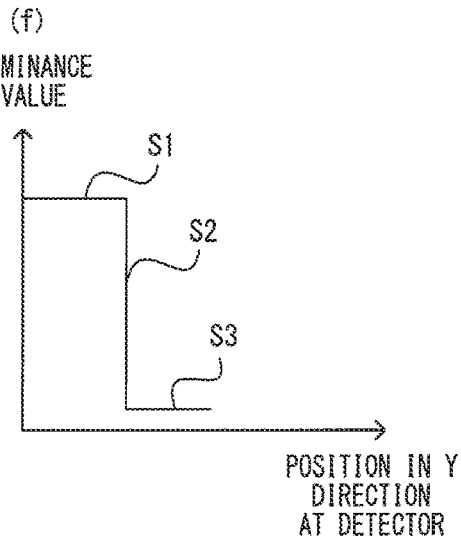

FIG.4
(a)
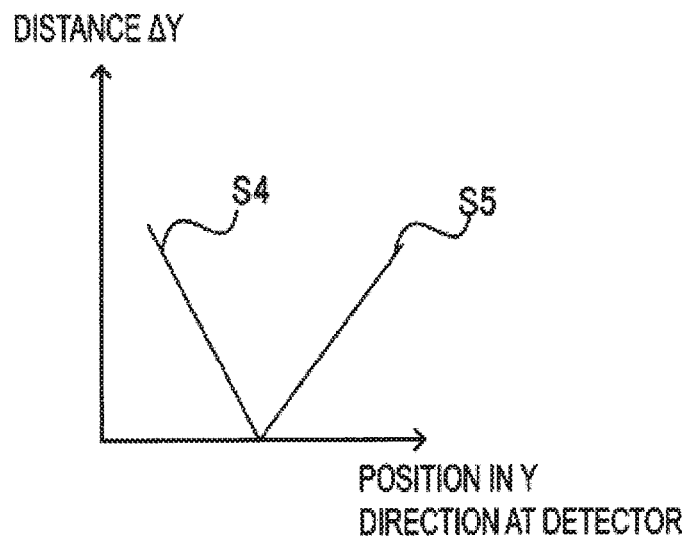
(b)
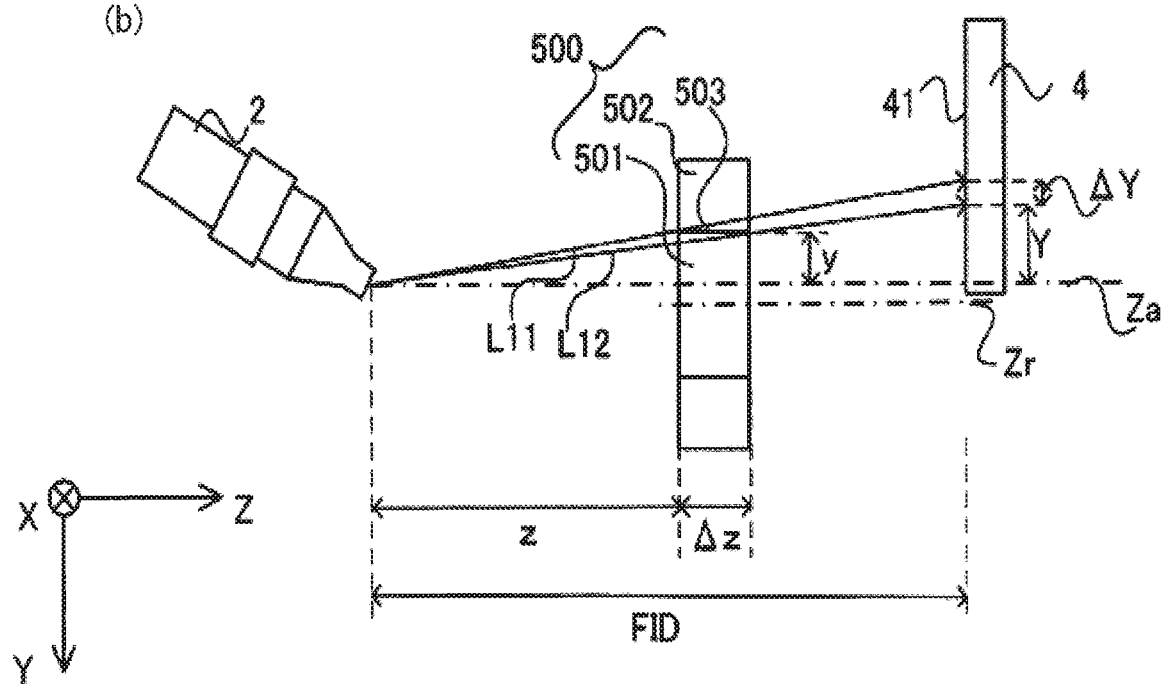

FIG.5
(a)
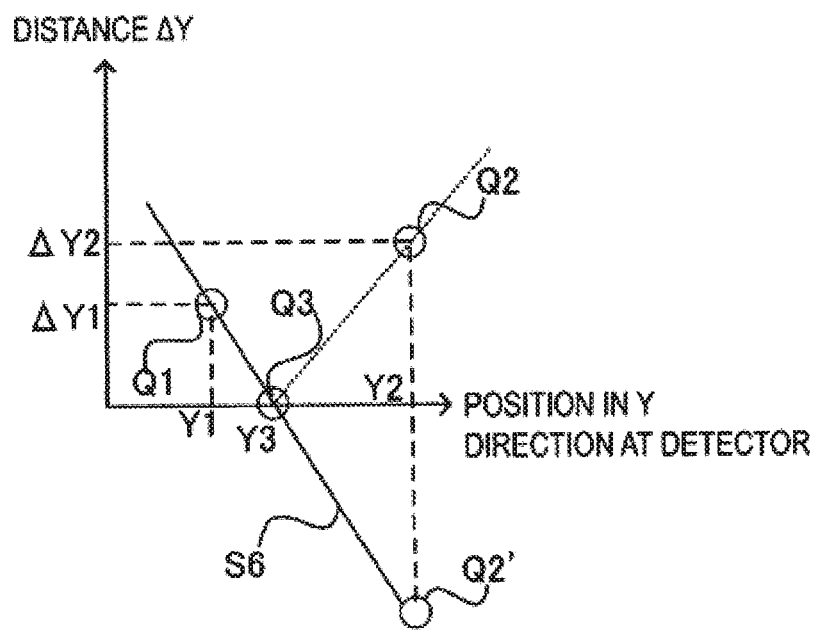
(b)
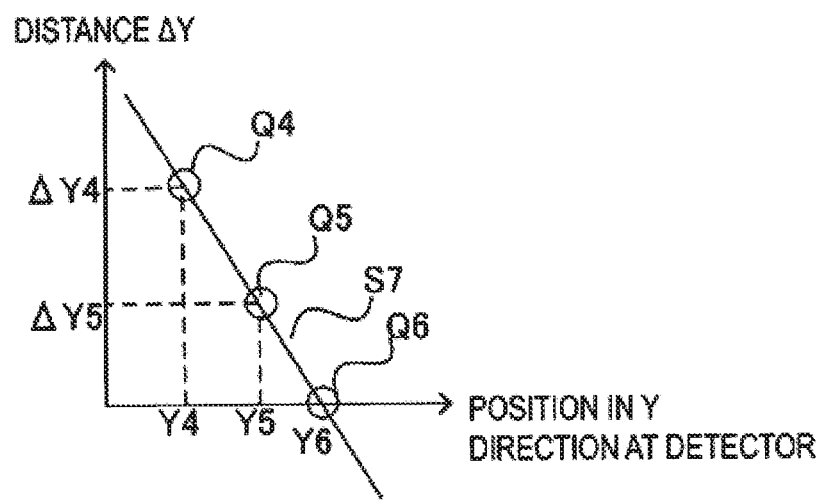

FIG.7
(a)
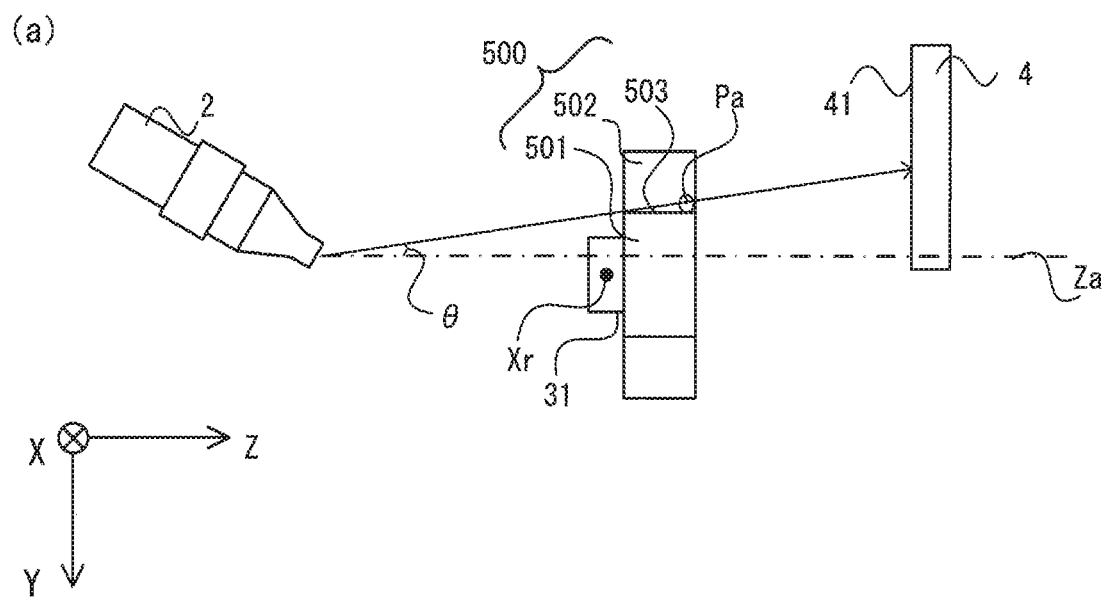
(b)
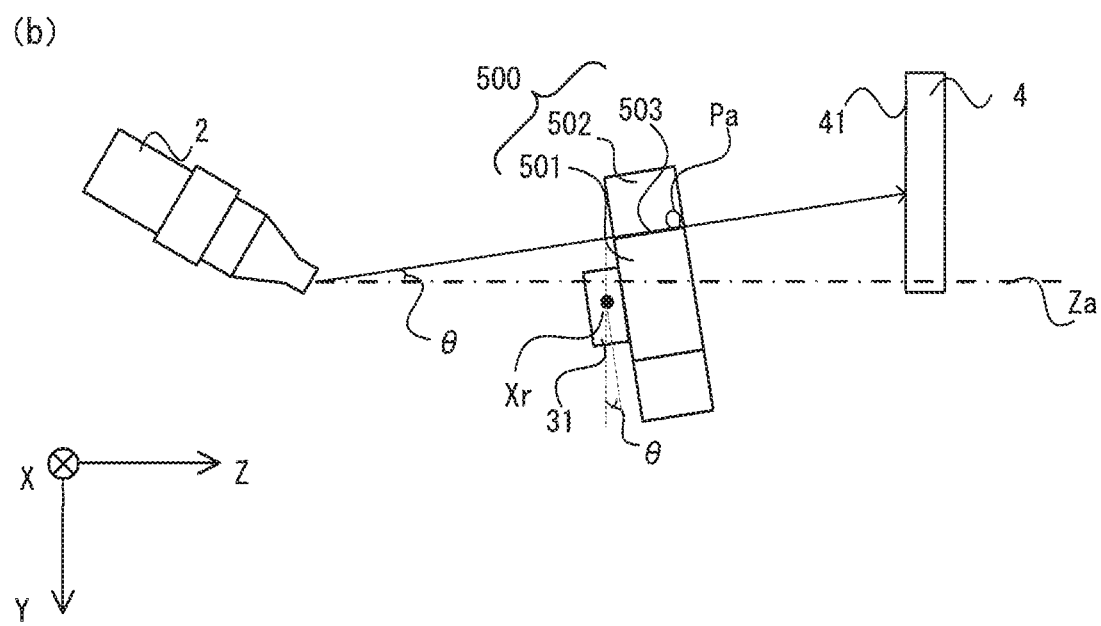

FIG.8
(a)
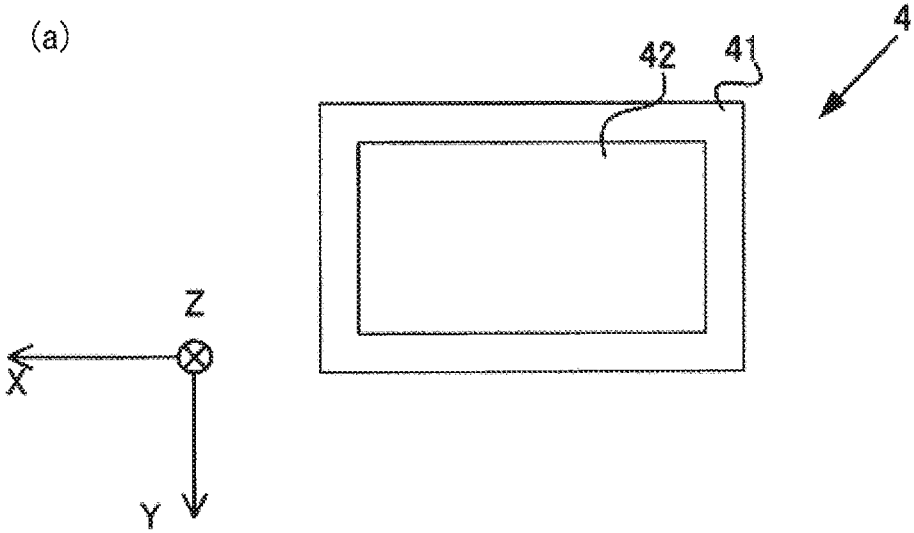
(b)
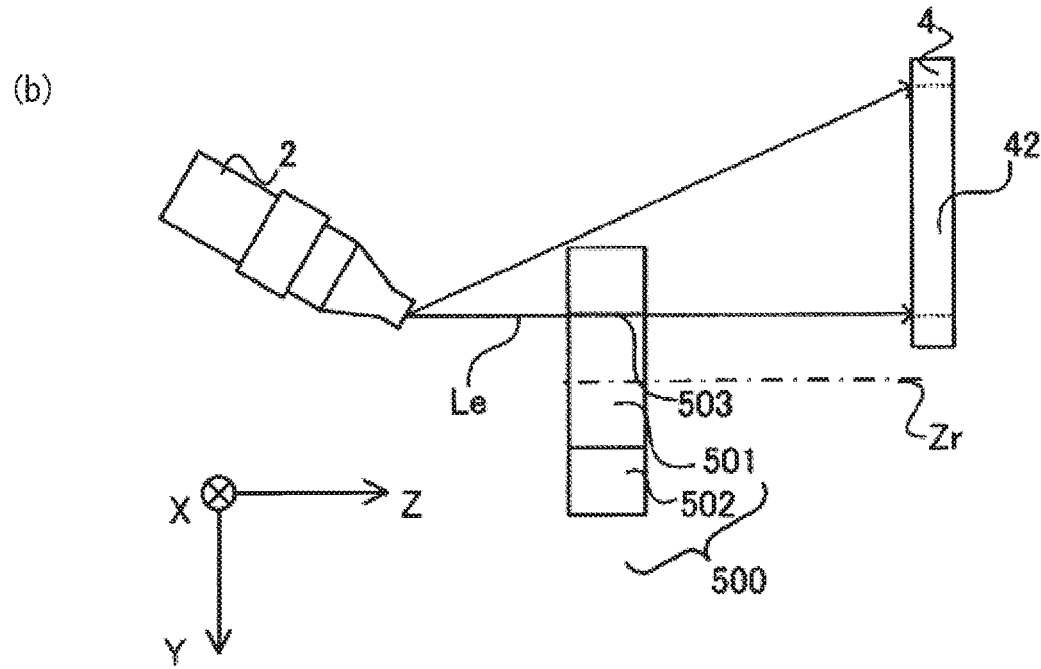

INSPECTION DEVICE, INSPECTION METHOD, AND METHOD FOR PRODUCING OBJECT TO BE INSPECTED

CROSS-REFERENCE TO RELATED PATENT APPLICATIONS

This application is a National Stage Entry of International Application No. PCT/JP2017/016604, filed Apr. 26, 2017. The entire content of the above-referenced application is expressly incorporated herein by reference.

TECHNICAL FIELD

The present invention relates to an inspection device, an inspection method, and a method for producing an object to be inspected.

BACKGROUND ART

An inspection device that irradiates an object to be inspected with X-rays and detects X-rays passing through the object to be inspected is known (Patent Document 1, for example). There is demand for an inspection device that can suppress a deterioration in inspection accuracy.

CITATION LIST

Patent Literature

Patent Document 1: US 2013/0,083,896 A

SUMMARY OF INVENTION

An inspection device according to a first aspect includes a ray source that irradiates an object to be inspected with an energy ray, a detection unit that detects an energy ray having passed through the object to be inspected, a displacement mechanism that sets a relative position of the object to be inspected and the ray source by displacing at least one of the object to be inspected and the ray source in relation to the other of the object to be inspected and the ray source, an internal image generation unit that generates an internal image of the object to be inspected based on a detection amount distribution of the energy ray detected by the detection unit, and a control unit that controls the displacement mechanism based on the detection amount distribution of the energy ray detected by the detection unit.

An inspection method according to a second aspect includes irradiating an object to be inspected with an energy ray from a ray source, detecting an energy ray having passed through the object to be inspected using a detection unit, generating an internal image of the object to be inspected based on a detection amount distribution of the energy ray detected by the detection unit, and setting the object to be inspected and the ray source by displacing, based on the detection amount distribution of the energy ray detected by the detection unit, at least one of the object to be inspected and the ray source relative to the other of the object to be inspected and the ray source, using a displacement mechanism.

An inspection method according to a third aspect includes irradiating an object to be inspected with an energy ray from a ray source, detecting an energy ray having passed through the object to be inspected using a detection unit, setting a relative position of the object to be inspected and the ray source by displacing at least one of the object to be inspected and the ray source in relation to the other of the object to be inspected and the ray source, using a displacement mechanism, generating an internal image of the object to be inspected based on a detection amount distribution of the energy ray detected by the detection unit, and controlling the displacement mechanism based on the detection amount distribution of the energy ray detected by the detection unit.

In a method for producing an object to be inspected according to a fourth aspect, an internal image is acquired using the inspection device according to the first aspect, and the internal image is compared with a reference image.

BRIEF DESCRIPTION OF DRAWINGS

FIG. 8 Diagrams schematically illustrating a positional relationship between the X-ray generation unit and the object to be measured in variation 2

DESCRIPTION OF EMBODIMENTS

First Embodiment

An X-ray device as an inspection device according to a first embodiment will be described with reference to the drawings. The X-ray device non-destructively acquires internal information (an internal structure, for example) of an object to be measured, by irradiating the object to be measured with X-rays and detecting transmission X-rays transmitted through the object to be measured. When the object to be measured is an industrial component such as a mechanical component or an electronic component, for example, the X-ray device is referred to as an industrial X-ray CT inspection device that inspects industrial components.

Figure 1:
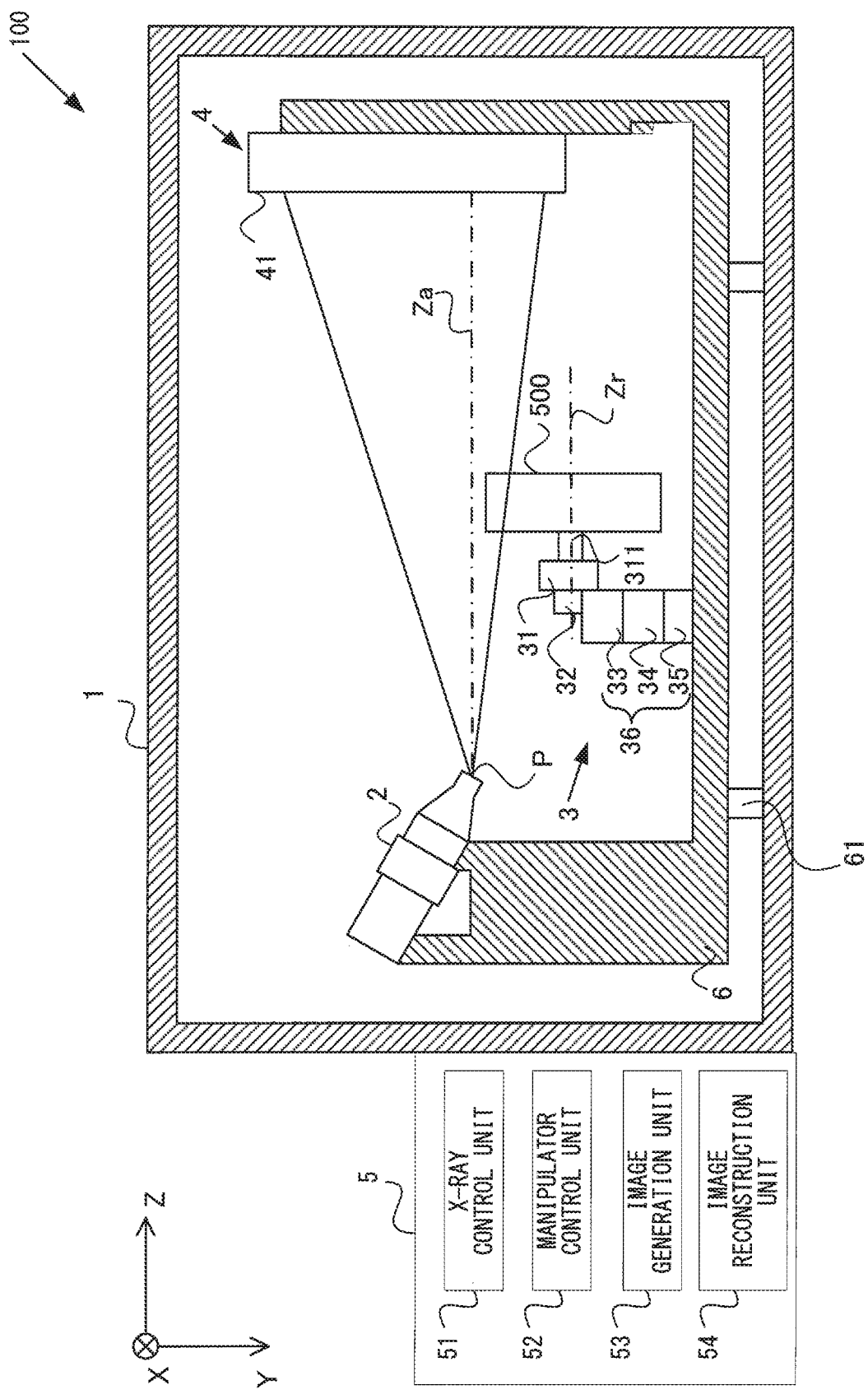
FIG. 1 A diagram schematically illustrating a configuration of an X-ray device according to a first embodiment FIG. 2 A diagram schematically illustrating a structure of an object to be inspected FIG. 3 Diagrams illustrating positional relationships between an X-ray generation unit, the object to be measured, and a detector according to the first embodiment FIG. 4 Diagrams illustrating a concept for changing positions of the X-ray generation unit and the object to be measured so as to have a predetermined positional relationship FIG. 5 Diagrams illustrating the concept for changing the positions of the X-ray generation unit and the object to be measured so as to have the predetermined positional relationship FIG. 6 A flowchart for describing operations of the X-ray device according to the first embodiment FIG. 7 Diagrams schematically illustrating a positional relationship between the object to be measured and the X-ray generation unit in variation 1

FIG. 1 is a diagram illustrating an example of a configuration of an X-ray device 100 according to the present embodiment. Note that for convenience of description, a coordinate system composed of an X axis, a Y axis, and a Z axis is set as illustrated in the drawing.

The X-ray device 100 is provided with a housing 1, an X-ray source 2, a placement unit 3, a detector 4, a control device 5, and a frame 6. The housing 1 is disposed on a floor surface of a factory or the like so as to be substantially parallel (horizontal) to the XZ plane, and the X-ray source 2, the placement unit 3, the detector 4, and the frame 6 are housed inside the housing 1. The housing 1 includes lead as a material so that X-rays do not leak to the outside.

In accordance with control by the control device 5, the X-ray source 2 emits X-rays (so-called cone beams) that are diffused energy rays diffused in a cone shape toward the positive Z axis direction with an emission point P illustrated in FIG. 1 as a vertex. This emission point P coincides with a focal position of an electron beam propagated inside the X-ray source 2, which will be described later. Note that, in the following description, an optical axis Za of the X-rays is an axis extending from the emission point P, which is the focal position of the electron beam of the X-ray source 2, orthogonally to an incident surface of the detector 4. Further, the X-ray source 2 may emit fan-shaped X-rays (so-called fan beams) or linear X-rays (so-called pencil beams) instead of emitting the cone-shaped X-rays. The X-ray source 2 emits at least one X-ray type, of approximately 50 eV ultrasoft X-ray emission, from approximately 0.1 to 2 keV soft X-ray emission, from approximately 2 to 20 keV X-ray emission, and from approximately 20 to 100 keV hard X-ray emission.

The placement unit 3 is provided with a placement table 31 on which an object to be measured 500 is fixed (placed) and a manipulator unit 36 that includes a rotation drive unit 32, an X axis movement unit 33, a Y axis movement unit 34, and a Z axis movement unit 35. The placement unit 3 is provided further to the positive Z axis side than the X-ray source 2. The placement table 31 is provided so as to be rotatable about a rotation axis Zr by the rotation drive unit 32. The rotation drive unit 32 moves in accordance with a movement of each of the X axis movement unit 33, the Y axis movement unit 34, and the Z axis movement unit 35. The rotation drive unit 32 is configured by an electric motor or the like, for example, and rotates the placement table 31 about the rotation axis Zr parallel to the Z axis, using a rotational force generated by driving of the electric motor controlled by the control device 5, which will be described later. Further, the placement table 31 can hold the object to be measured 500 using a chucking mechanism to be described below. The X axis movement unit 33, the Y axis movement unit 34, and the Z axis movement unit 35 are controlled by the control device 5, and respectively move the placement table 31 in the X axis direction, the Y axis direction, and the Z axis direction so that the object to be measured 500 is positioned in an appropriate position within an irradiation range of the X-rays emitted by the X-ray source 2. Furthermore, the Z axis movement unit 35 is controlled by the control device 5, and moves the placement table 31 in the Z axis direction so that a distance from the X-ray source 2 to the object to be measured 500 is projected on the detector 4 in a desired size.

The detector 4 illustrated in FIG. 1 is provided further to the positive Z axis side than the placement table 31. That is, the placement table 31 is provided between the X-ray source 2 and the detector 4 in the Z axis direction. The detector 4 includes an incident surface 41 parallel to the XY plane, and X-rays emitted from the X-ray source 2, including transmission X-rays transmitted through the object to be measured 500 placed on the placement table 31, enters the incident surface 41. The detector 4 is configured by a scintillator unit including a known scintillating substance, a light receiving unit that receives light emitted from the scintillator unit, and the like. The detector 4 converts the X-rays incident on the incident surface 41 on the scintillator unit to light energy, converts the light energy to electric energy using the above-described light receiving unit, and outputs the electric energy to the control device 5 as an electric signal. Note that the detector 4 may directly convert the incident X-rays to the electric signal without converting the X-rays into the light energy. Further, the detector 4 has a structure in which the scintillator unit and the light receiving unit are respectively divided into a plurality of pixels, which are arranged in a two-dimensional manner. In this way, a detection amount distribution of the X-rays emitted from the X-ray source 2 and have passed through the object to be measured 500 can be acquired at one time. Then, an internal image of the object to be inspected 500 can be generated based on this detection amount distribution.

The frame 6 supports the X-ray source 2, the manipulator unit 36 of the placement unit 3, and the detector 4. The frame 6 is configured to have a sufficient rigidity. Thus, during acquisition of a projection image of the object to be measured 500, the frame 6 can support the X-ray source 2, the manipulator unit 36, and the detector 4 without changing relative positions thereof. Further, the frame 6 is supported by an anti-vibration mechanism 61 to prevent externally generated vibrations from being directly transmitted to the frame 6.

The control device 5 includes a microprocessor, its peripheral circuits, and the like, and controls various units of the X-ray device 100 by reading and executing a control program stored in advance in a storage medium (a flash memory or the like, for example), which is not illustrated in the drawings. The control device 5 includes, as functions, an X-ray control unit 51 that controls operations of the X-ray source 2, a manipulator control unit 52 that controls a drive operation of the manipulator unit 36, an image generation unit 53 that generates, based on an electric signal output from the detector 4, X-ray projection image data, which are the internal image of the object to be measured 500 and which include internal information thereof, and an image reconstruction unit 54 that performs known image reconstruction processing, while controlling the manipulator unit 36, to generate a reconstructed image of the object to be measured 500 based on the projection image data of the object to be measured 500, each of the projection image data having a different projection direction. Three-dimensional data and tomographic image data, which are an internal structure (a cross-sectional structure) of the object to be measured 500 are generated by the image reconstruction processing. In this case, a back projection method, a filtered back projection method, an iterative reconstruction method, or the like may be used as the image reconstruction processing.

Figure 2:
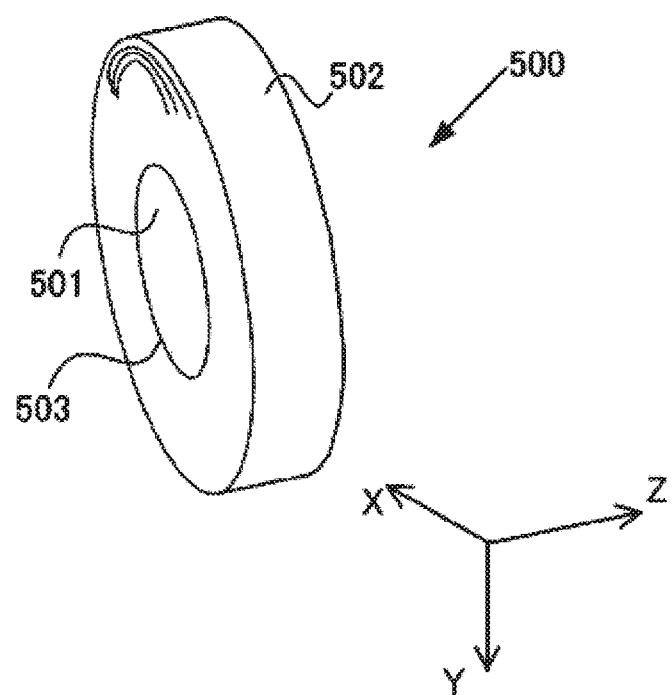

FIG. 2 is a diagram schematically illustrating an example of the object to be measured 500 as an object to be inspected, for which the presence or absence of a foreign object or the like is inspected by the X-ray device 100 of the present embodiment. The object to be measured 500 is a film-like or fibrous object, for example, and includes cellulose, a plastic film, and the like. The object to be measured 500 is configured by a winding frame 501 and an object to be wound 502. The winding frame 501 is formed, for example, in a columnar shape or a cylindrical shape, and the object to be wound 502 is wound on a side surface of the column or the cylinder. In the present embodiment, as an example, a case is described in which the object to be wound 502 formed in a sheet shape is wound around the winding frame 501. The winding frame 501 and the object to be wound 502 are formed of mutually different materials. Thus, the winding frame 501 and the object to be wound 502 have mutually different X-ray absorption coefficients. In general, the winding frame 501 is formed of a material having a rigidity greater than that of the object to be wound 502. Thus, the X-ray absorption coefficient of the winding frame 501 is higher than that of the object to be wound 502. Therefore, the X-ray transmittance of the object to be wound 502 is higher than that of the winding frame 501.

Note that the object to be measured 500 is not limited to the structure in which the object to be wound 502 is wound around the winding frame 501. The object to be measured 500 includes a first member and a second member having an X-ray absorption coefficient different from that of the first member, and has a structure in which the first member and the second member are in contact with each other having a boundary surface therebetween. For example, the object to be measured 500 can have a configuration in which the first member having the X-ray absorption coefficient higher than that of the second member is formed, for example, in a flat plate shape, and the second member is layered on the flat plate-shaped first member.

At the time of producing the object to be measured 500, for example, during a process in which the object to be wound 502 is wound around the winding frame 501, a foreign object or the like may adhere between the object to be wound 502 and the winding frame 501 or between layers of the object to be wound 502 that has a layered structure as a result of being wound, or a defect, such as a scratch on the object to be wound 502, may occur. The X-ray device 100 of the present embodiment holds the winding frame 501 using the chucking mechanism provided on the placement table 31, and then inspects the presence or absence of the foreign object or the like on a boundary surface 503 between the winding frame 501 and the object to be wound 502, that is, the side surface of the column or the cylinder forming the winding frame 501, or between the layers of the object to be wound 502, and for the defect, such as the scratch occurring on the object to be wound 502. When inspecting the object to be measured 500, the X-ray device 100 sets relative positions of the object to be measured 500 and the X-ray source 2 based on the electric signal output from the detector 4 in accordance with an intensity distribution of the X-rays incident on the detector 4. A detailed description is given below.

First, with reference to FIG. 3, positional relationships between the object to be measured 500, the X-ray source 2, and the detector 4 in the present embodiment, and a relationship between the boundary surface 503 of the winding frame 501 and X-rays propagated in the vicinity of the boundary surface 503 will be described.

FIG. 3(a) schematically illustrates a case in which the optical axis Za of the X-rays from the X-ray source 2 passes through a region of the winding frame 501. In this case, an energy ray L11 of the X-rays propagated from the X-ray source 2 passes through a region 503f of an end portion, on the negative Z direction side, of the boundary surface 503 between the winding frame 501 and the object to be wound 502, passes through the object to be wound 502, and enters a position Y11 of the detector 4. In addition, an energy ray L12 passes through the winding frame 501, passes through a region 503r of an end portion, on the positive Z direction side, of the boundary surface 503, and enters a position Y12 of the detector 4.

Energy rays passing through further to the negative Y direction side than the energy ray L11 only pass through the object to be wound 502, and energy rays passing through further to the positive Y direction side than the energy ray L12 and between the energy ray L12 and the optical axis Za only pass through the winding frame 501. Here, a value S1 of an electric signal output from a region of the detector 4 which the energy rays passing through further to the negative Y direction side than the energy ray L11 enter is compared to a value S3 of an electric signal output from a region of the detector 4 which the energy rays passing through further to the positive Y direction side than the energy ray L12 enter. As described above, the X-ray absorption coefficient of the winding frame 501 is higher than that of the object to be wound 502. Therefore, S1 is a value greater than S3.

Regarding the energy rays between the energy ray L11 and the energy ray L12, the closer the energy ray is to the energy ray L12 from the energy ray L11, the greater a distance of passage of the energy ray through the winding frame 501. In accordance with this, the X-ray transmittance decreases, so the electric signal output from the detector 4 decreases from S1 at the position Y11 towards S3 at the position Y12. In other words, the electric signal changes as indicated by S2. This state is illustrated in FIG. 3(b).

However, in a case where a foreign object Pa exists at or near the boundary surface 503, since a change in the X-ray transmittance caused by the foreign object Pa may overlap with a change in the X-ray transmittance caused by a change in the distance of passage through the winding frame 501, there is a possibility that it may become difficult to detect the foreign object Pa.

FIG. 3(c) schematically exemplifies a case in which the optical axis Za of the X-rays from the X-ray source 2 passes through the positive Y direction side without passing through the winding frame 501. In this case, an energy ray L21 of the X-rays propagated from the X-ray source 2 passes through the object to be wound 502, passes through the region 503r of the end portion, on the positive Z direction side, of the boundary surface 503 between the winding frame 501 and the object to be wound 502, and then enters a position Y21 of the detector 4. Further, an energy ray L22 passes through the region 503f of the end portion, on the negative Z direction side, of the boundary surface 503 between the winding frame 501 and the object to be wound 502, passes through the winding frame 501, and enters a position Y22 of the detector 4.

Energy rays passing through further to the negative Y direction side than the energy ray L21 only pass through the object to be wound 502, and energy rays passing through further to the positive Y direction side than the energy ray L22 only pass through the winding frame 501. Therefore, for the same reasons as those described in relation to FIG. 3(a), the value S1 of the electric signal output from the region of the detector 4 which the energy rays passing through further to the negative Y direction side than the energy ray L21 enter is greater than the value S3 of the electric signal output from the region of the detector 4 which the energy rays passing through further to the positive Y direction side than the energy ray L22 enter. Further, regarding the energy rays between the energy ray L21 and the energy ray L22, the closer the energy ray is to the energy ray L22 from the energy ray L21, the greater the distance of passage of the energy ray through the winding frame 501. In accordance with this, the X-ray transmittance decreases, so the electric signal output from the detector 4 decreases from S1 at the position Y11 towards S3 at the position Y12. In other words, the electric signal changes as indicated by S2. This state is illustrated in FIG. 3(d). In this case also, in a case where the foreign object Pa exists at or near the boundary surface 503, since the change in the X-ray transmittance caused by the foreign object Pa may overlap with the change in the X-ray transmittance caused by the change in the distance of passage through the winding frame 501, there is a risk that it may become difficult to detect the foreign object Pa.

FIG. 3(*e*) schematically exemplifies a case in which the optical axis Za of the X-rays from the X-ray source 2 is propagated along the boundary surface 503 between the winding frame 501 and the object to be wound 502. In this case, an energy ray L3 of the X-rays from the X-ray source 2 passing through the optical axis Za passes through along the boundary surface 503 between the winding frame 501 and the object to be wound 502. Energy rays passing through further to the negative Y direction side than the energy ray L3 only pass through the object to be wound 502, and energy rays passing through further to the positive Y direction side than the energy ray L3 only pass through the winding frame 501. In other words, with respect to the value of the electric signal output from the detector 4, taking an incident position of the energy ray L3 as a boundary, the energy rays that have only passed through the object to be wound 502 enter the negative Y direction side, and the energy rays that have only passed through the winding frame 501 enter the positive Y direction side. Thus, the value of the electric signal output from the detector 4 drastically changes between S1 and S3. This state is illustrated in FIG. 3(*f*). In this case, even if the foreign object Pa exists at or near the boundary surface 503, since the change in the X-ray transmittance due to the foreign object is detected only in relation to the transmittance of the object to be wound 502 without overlapping with the change in the X-ray transmittance caused by the change in the distance of passage through the winding frame 501, the foreign object Pa can be detected accurately.

The X-ray device 100 of the present embodiment irradiates the object to be measured 500 with the X-rays from the X-ray source 2 in a state in which the X-ray source 2 and the object to be measured 500 are in any given positional relationship, and sets the relative positions of the X-ray source 2 and the object to be measured 500 based on the detection amount distribution of the X-rays incident on the detector 4. Specifically, the X-ray device 100 controls the manipulator 36, which is a displacement mechanism, so that a positional relationship in which the detector 4 detects only the X-rays that have passed through the object to be wound 502 of the object to be measured 500 is obtained. In the present embodiment, the X-ray device 100 controls the manipulator 36 so that the optical axis Za is oriented in a direction along the boundary surface 503 between the winding frame 501 and the object to be wound 502. In other words, the object to be measured 500 and the X-ray source 2 are set to have a positional relationship as illustrated in FIG. 3(*e*).

In the present embodiment, the X-ray control unit 51 causes the X-ray source 2 to irradiate the object to be measured 500 with the X-rays for each of states in which the X-ray source 2 and the object to be measured 500 have a different relative positional relationship in the Y direction. For each of the states having the different positional relationship, the manipulator control unit 52 performs processing for obtaining the above-described positional relationship (hereinafter referred to as a target positional relationship) illustrated in the above mentioned FIG. 3(*e*), based on the incident position of the X-rays on the detector 4 and the detection amount distribution of the X-rays (in other words, luminance values of the projection image of the object to be measured 500) obtained when the X-rays are irradiated from the X-ray source 2 and enter the detector 4.

A concept for performing the processing for obtaining the target positional relationship will be described below.

On the basis of distribution information of the luminance values of the projection image based on the electric signals output from the detector 4, and positions in the Y direction on the detector 4 which the X-rays enter, the manipulator control unit 52 calculates a distance $\Delta Y$ in the Y direction in a region in which the luminance value changes in accordance with the position. At the same time, a distance from a position at which the energy ray enters vertically the detector 4 to Y12 is calculated, and the distances $\Delta Y$ and Y are plotted. In order to calculate the distance $\Delta Y$, by plotting the detected luminance values and positions in the Y direction, graphs as illustrated in FIGS. 3(*b*), 3(*d*), and 3(*f*) are created. It is assumed that the graph illustrated in FIG. 3(*b*) is created, for example, by approximating the results of the plotting using three straight lines. In this case, the distance $\Delta Y$ can be calculated from intersection points of two of the three straight lines (see reference signs S1, S2, and S3 in FIG. 3(*b*)), namely, positions of the intersection point of the straight lines S1 and S2 and the intersection point of the straight lines S2 and S3. In other words, a difference between an intersection point Y11 of the straight lines S1 and S2 and an intersection point Y12 of the straight lines S2 and S3 can be calculated as the distance $\Delta Y$ (a distance $\Delta Y1$ illustrated in FIG. 3(*b*)), in a case in which the X-ray source 2 and the object to be measured 500 have the positional relationship illustrated in FIG. 3(*a*).

Next, the distance $\Delta Y$ is also calculated in the same manner in a state in which the positional relationship between the X-ray source 2 and the object to be measured 500 is changed. When it is assumed that the positional relationship between the X-ray source 2 and the object to be measured 500 is changed to the relationship illustrated in FIG. 3(*c*), a distance $\Delta Y2$ illustrated in FIG. 3(*d*) is calculated as the distance $\Delta Y$. A plurality of the calculated distances $\Delta Y$ and the positions in the Y direction on the detector 4 used when calculating the distances $\Delta Y$ are plotted.

FIG. 4(*a*) schematically illustrates an example of a plurality of plotted points. As illustrated in FIG. 4(*a*), the plurality of plotted points are approximated using two straight lines S4 and S5, and the distance $\Delta Y$ has a minimum value. The reason why the distance $\Delta Y$ has the minimum value on the graph illustrated in FIG. 4(*a*) will be described. FIG. 4(*b*) is a diagram schematically illustrating the X-ray source 2, the object to be measured 500, and the detector 4 in a case in which the optical axis Za of the X-rays from the X-ray source 2 passes through the winding frame 501 in the same manner as in FIG. 3(*a*). In FIG. 4(*b*), the length (the thickness) in the Z direction of the winding frame 501 of the object to be measured 500 is denoted by $\Delta z$, a distance in the Z direction from the X-ray source 2 to the object to be measured 500 is denoted by z, and a distance from the X-ray source 2 to the incident surface 41 on the detector 4 is denoted by FID. Among distances between the optical axis Za of the X-rays from the X-ray source 2 and the boundary surface 503 of the winding frame 501, a position in the Y direction of the boundary surface 503 having the largest distance on the positive Y direction side is denoted by y.

In this case, a relational expression between the position Y on the detector 4 which the X-rays that have passed through the end portion 501r on the positive Z axis side of the winding frame 501 enter and the distance $\Delta Y$ can be expressed by Expressions (1) and (2) below, based on the similarity of triangles.

$$y/z = (Y+\Delta Y)/FID \tag{1}$$

$$y/(z+\Delta z) = Y/FID \tag{2}$$

From these two Expressions (1) and (2), Expression (3) below can be obtained.

$$\Delta Y = \Delta z/z \cdot Y \quad (3)$$

Since Δz is the length (the thickness) in the Z direction of the winding frame 501 of the object to be measured 500, and z is the distance in the Z direction from the X-ray source 2 to the object to be measured 500. Δz/z is a constant in Expression (3). Therefore, in Expression (3), the relationship between the distance ΔY and the position Y is expressed by a linear expression.

As illustrated in FIGS. 3(*b*) and 3(*d*), since the distance ΔY is calculated only by the amount of change in the luminance value, the distance ΔY is always treated as a positive value. For this reason, with the position y at which the optical axis Za of the X-rays and the boundary surface 503 of the object 500 coincide as a boundary, the sign of the inclination of Expression (3) expressed by the linear expression is inverted, namely, the distance ΔY has the minimum value. Thus, as illustrated in FIG. 4(*a*), the plurality of plotted points are approximated using the two straight lines S4 and S5. Therefore, in FIG. 4(*a*), by aligning the boundary surface 503 on the winding frame 501 with the position y obtained when the distance ΔY is the minimum value, the positional relationship between the X-ray source 2 and the object to be measured 500 becomes the positional relationship illustrated in FIG. 3(*e*). In other words, the position y obtained when the distance ΔY is the minimum value is the target positional relationship between the X-ray source 2 and the object to be measured 500.

In accordance with the concept described above, each time that the positional relationship in the Y direction between the X-ray source 2 and the object to be measured 500 is set to be in a different state, the manipulator control unit 52 calculates the distance ΔY using the position Y on the detector 4 which the X-rays propagated at and near the boundary surface 503 of winding frame 501 enter, and Expression (3). In other words, the manipulator control unit 52 calculates the distance ΔY based on the acquired detection amount distribution of the X-rays for each of the plurality of different positional relationships in the Y direction between the placement table 31 and the detector 4, and controls the Y axis movement unit 34. At this time, the manipulator control unit 52 detects the position Y on the detector 4 based on the luminance values while using the projection image, which is the internal image generated by the image generation unit 53. Note that the manipulator control unit 52 may detect the position Y on the detector 4 while using the three-dimensional data (tomographic image data) generated by the image reconstruction unit 54 as the internal image. The manipulator control unit 52 calculates a target positional relationship y based on the approximation straight lines illustrated in FIG. 4(*a*), using a plurality of the calculated distances ΔY. The manipulator control unit 52 calculates a movement amount of the placement table 31 required to achieve the position y. In this case, using Expressions (1) and (2) described above, the target positional relationship y is calculated as a movement amount y according to Expression (4) below.

$$\text{Amount of movement } y = \Delta t/(FID/z - FID/(z+\Delta z)) \quad (4)$$

The manipulator control unit 52 outputs, to the Y axis movement unit 34, a signal instructing a movement by the above-described amount of movement y, and causes the placement table 31 to move in the Y direction by the movement amount y.

Note that it is described above that the target positional relationship y is calculated using the plurality of acquired positions Y on the detector 4, each time that the positional relationship in the Y direction between the X-ray source 2 and the object to be measured 500 is set to be in a different state. The target positional relationship y can be calculated using two of the different positions Y as the plurality of positions Y. In this case also, by creating an approximation line plotting the two different positions Y and the distances ΔY, the target positional relationship y in which the distance ΔY is the minimum value is calculated.

FIG. 5(*a*) schematically illustrates an example of an approximation line created when using the positions Y on the detector 4 acquired in the state illustrated in FIG. 3(*a*) and the positions Y on the detector 4 acquired in the state illustrated in FIG. 3(*c*). In this case, the minimum value of the distance ΔY exists between two points Q1 (Y1, ΔY1) and Q2 (Y2, ΔY2) plotted as illustrated in FIG. 5(*a*). In this case, by changing the sign of the distance ΔY of one of the two points Q1 and Q2 to be negative, the one of the points Q1 and Q2 is moved to a position symmetrical with respect to the axis ΔY=0. FIG. 5(*a*) illustrates a case in which the point Q2 (Y2, ΔY2) is moved to a point Q2' (Y2, −ΔY2), for example. On an approximation line S6 connecting the points Q1 and Q2', a value Y3 at a point Q3 (Y3, 0) is the target positional relationship y at which the distance ΔY is the minimum value.

FIG. 5(*b*) schematically illustrates an example of an approximation line created in a case in which two of the different positions Y on the detector 4 are acquired in the state illustrated in FIG. 3(*a*). Note that the following description can also be applied to an approximation line created in a case in which two of the different positions Y are acquired in the state illustrated in FIG. 3(*c*). The minimum value does not exist between two points Q4 (Y4, ΔY4), and Q5 (Y5, ΔY5) plotted as illustrated in FIG. 5(*b*). In this case, a value Y6 at a point Q6 (Y6, 0), which is obtained when an approximation line S7 connecting the point Q4 and the point Q5 satisfies ΔY=0, is the target positional relationship y at which the distance ΔY is the minimum value.

Further, in the description above, an example is given of a case in which the target positional relationship y in which the distance ΔY is the minimum value is calculated based on the plurality of positions Y on the detector 4 acquired in the plurality of states in which the positional relationship in the Y direction between the X-ray source 2 and the object to be measured 500 is varied. However, the present invention is not limited to this example. For example, when the distance z in the Z direction from the X-ray source 2 to the object to be measured 500 and the thickness Δz of the winding frame are known, the target positional relationship y in which the distance ΔY is the minimum value may be calculated based on the single position Y on the detector 4, which is acquired without varying the positional relationship in the Y direction between the X-ray source 2 and the object to be measured 500. In this case, the manipulator control unit 52 calculates the inclination Δz/z of Expression (3) described above, and creates an approximation straight line based on the acquired distance ΔY and the inclination Δz/z passing through the position Y. A value of the position Y when the distance ΔY is 0 in this approximation straight line is calculated as the target positional relationship y in which the distance ΔY is the minimum value.

Figure 6:
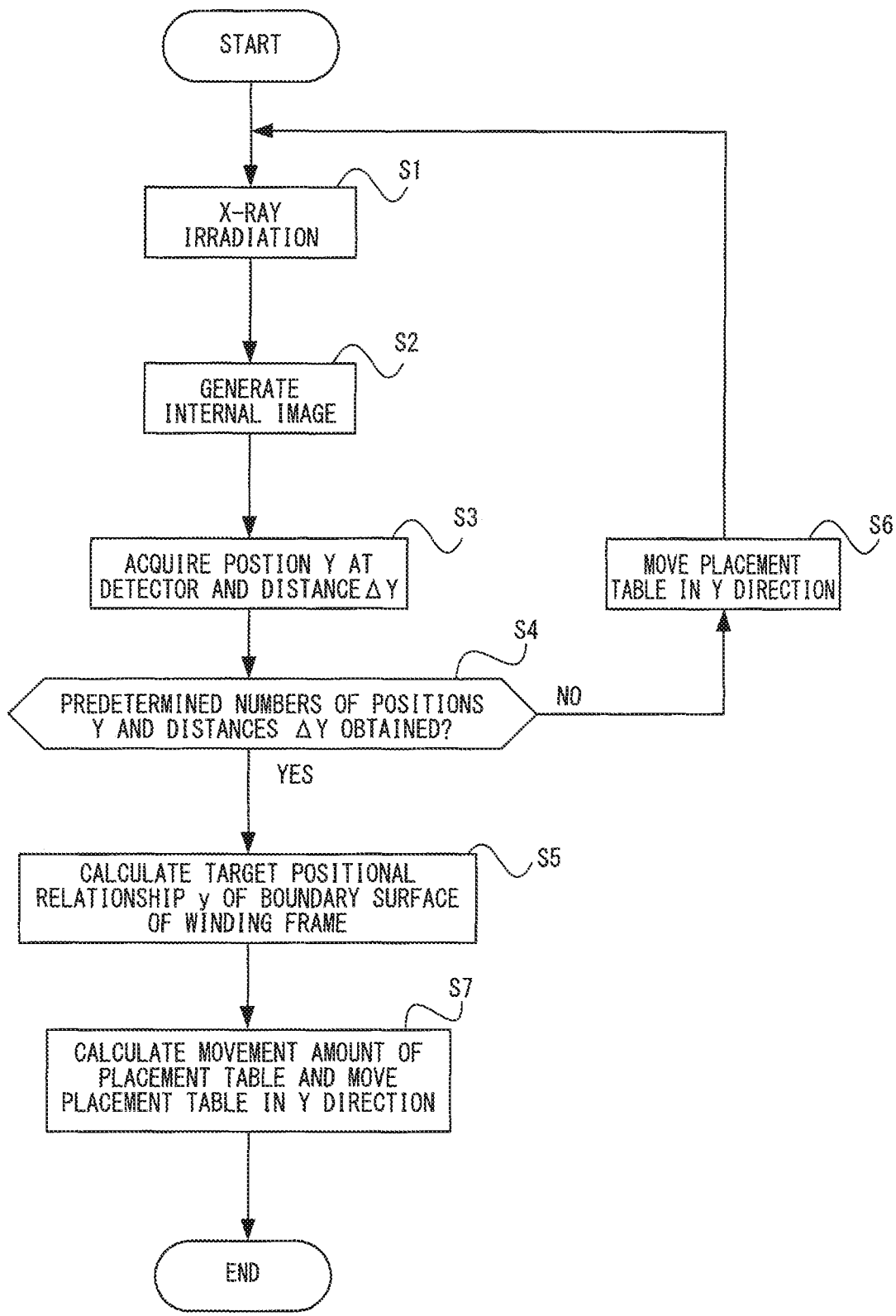

Next, operations of the X-ray device 100 for setting the positional relationship in the Y direction between the X-ray source 2 and the object to be measured 500 will be described with reference to a flowchart illustrated in FIG. 6. Each of processing illustrated in the flowchart of FIG. 6 is performed by the control device 5 executing the program. This program is stored in a memory (not illustrated) and is activated and executed by the control device 5.

At step S1, the X-ray control unit 51 irradiates the object to be measured 500 held by the chucking mechanism of the placement table 31 with X-rays, and the flow proceeds to step S2. Note that, as the chucking mechanism of the placement table 31, when the winding frame 501 is a hollow structural body having an annular shape, a three-claw chucking mechanism 311 that can be inserted into a hollow region is preferable. When the three-claw chucking mechanism 311 is inserted into the hollow region of the winding frame 501, by opening the three-claw chucking mechanism 311 outward, the inner circumferential surface of the hollow region may be pressed outward so that the winding frame 501 is held by the placement table 31. Note that a method of chucking the object to be measured 500 is not limited to this example. Further, with respect to the positional relationships of the X axis, the Y axis, and the Z axis with respect to the X-ray source 2, the object to be measured 500 placed on the placement table 31 is set in any given position. In this case, the positional relationship between the X-ray source 2 and the object to be measured 500 in terms of the X axis and the Z axis (namely, magnification directions) may be set to a position desired by a user, and the X-ray source 2 may irradiate the object to be measured 500 with X-rays.

At step S2, the image generation unit 53 generates the internal image based on the electric signal output from the detector 4, and the flow proceeds to step S3. At step S3, the manipulator control unit 52 calculates the distance ΔY on the detector 4 in the region in which the luminance value changes, based on a relationship between the distribution information of the luminance values of the generated internal image and the positions Y, and the flow proceeds to step S4. At step S4, it is determined whether predetermined numbers of the positions Y and the distances ΔY can be acquired. When the predetermined numbers of the positions Y and the distances ΔY have been acquired, an affirmative determination is made at step S4 and the flow proceeds to step S5. When the predetermined numbers of the positions Y and the distances ΔY have not been acquired, a negative determination is made at step S4 and the flow proceeds to step S6. At step S6, the manipulator control unit 52 controls the Y axis movement unit 34 to move the placement table 31 by a predetermined movement amount along the Y direction.

At step S5, the manipulator control unit 52 calculates the target positional relationship y of the placement table 31 using the plurality of acquired positions Y and distances ΔY, and the flow proceeds to step S7. Note that when the manipulator control unit 52 calculates the target positional relationship y based on the single position Y and the single distance ΔY, the processing at step S4 need not necessarily be performed. At step S7, the manipulator control unit 52 calculates the movement amount of the placement table 31 in the Y direction based on the calculated target positional relationship y, controls the Y axis movement unit 34 to move the placement table 31 along the Y direction, and terminates the processing.

When the above-described processing is performed to set the positional relationship in the Y direction between the X-ray source 2 and the object to be measured 500, the X-ray device 100 performs measurement processing on the object to be measured 500. In the present embodiment, the control device 5 controls the Z axis movement unit 35 to move the placement table 31 relative to the X-ray source 2 and the detector 4, and positions the object to be measured 500 at a desired magnification. Then, the manipulator control unit 52 controls the rotation drive unit 32 to rotate the placement table 31 supporting the object to be measured 500 around the rotation center axis Zr. While rotating the placement table 31, the X-ray control unit 51 controls the X-ray source 2 to irradiate the object to be measured 500 with X-rays.

The detector 4 detects a transmission X-ray transmitted through the object to be measured 500 at each of predetermined rotation angles of the placement table 31, and outputs the detection result to the control device 5 as an electric signal. The image generation unit 53 of the control device 5 generates projection image data of the entire object to be measured 500 for each of projection directions, based on the electric signal acquired for each of the rotation angles of the placement table 31. In other words, the image generation unit 53 generates the projection image data of the entire object to be measured 500.

As described above, the X-ray source 2 and the object to be measured 500 are set to be in the target positional relationship, and the measurement is performed. Thus, the projection image, which is the generated internal image, includes at least one of an image of the boundary surface 503 between the object to be wound 502 and the winding frame 501 of the object to be measured 500, an image between the layers of the layered object to be wound 502, and an image of the inside of the object to be wound 502 itself. As a result, when detecting the foreign object or the defect in the object to be wound 502, in accordance with an X-ray emission amount of the X-ray source 2 at the time of the inspection, by setting a threshold value based on a specified luminance value or a reference image obtained when the same X-ray emission amount is applied, and by simply comparing the threshold value or the reference image with the generated internal image, it is also possible to inspect the presence or absence of the foreign object and the like on the boundary surface 503 between the winding frame 501 and the object to be wound 502 or between the layers of the object to be wound 502, or for the presence or absence of the defect, such as the scratch, occurring in the object to be wound 502.

According to the first embodiment described above, the following effects are obtained.

(1) The manipulator control unit 52 controls the Y axis movement unit 34 based on the detection amount distribution of the X-rays detected by the detector 4. As a result, for example, when inspecting the presence or absence of the foreign object or the like in the vicinity of a boundary between members of the object to be inspected 500 that have mutually different absorption coefficients, an inspection failure can be suppressed by setting the object to be measured 500 and the X-ray source 2 to be in relative positions suitable for the inspection.

(2) The manipulator control unit 52 controls the Y axis movement unit 34 so that the detector 4 is in a positional relationship in which the detector 4 detects only the object to be wound 502 of the object to be measured 500. Specifically, the manipulator control unit 52 controls the Y axis movement unit 34 so that the positional relationship between the X-ray source 2 and the object to be measured 500 is a positional relationship that causes part of the energy rays of the X-rays from the X-ray source 2 to be propagated along the boundary surface 503 between the winding frame 501 and the object to be wound 502. As a result, it is possible to suppress the generated internal image from becoming an image that includes a dark section having a low luminance value as a result of being affected by the winding frame 501 having the larger X-ray absorption coefficient, and a bright section that is hardly affected by the winding frame 501.

Therefore, since it is possible to inspect the presence or absence of the defect that occurs in the object to be wound 502 using the internal image in which the brightness of the background is entirely uniform, even a minute defect can be easily detected, and the inspection accuracy can thus be improved.

(3) The manipulator control unit 52 controls the Y axis movement unit 34 based on the detection amount distribution of the energy rays propagated at or near the boundary surface 503 between the object to be wound 502 and the winding frame 501. As a result, the positional relationship between the X-ray source 2 and the object to be measured 500 for causing the X-rays to be propagated along the boundary surface 503 of the winding frame 501 can be calculated.

(4) The Y axis movement unit 34 displaces a placement surface of the placement table 31 on which the object to be inspected is placed in relation to the detector 4 in the Y direction intersecting with the propagation direction of the energy rays. As a result, it is possible to set the positional relationship between the X-ray source 2 and the object to be measured 500 for causing the X-rays to be propagated along the boundary surface 503 of the winding frame 501.

(5) The manipulator control unit 52 acquires the detection amount distribution of the energy rays for each of the plurality of different positional relationships between the placement table 31 and the detector 4, and controls the Y axis movement unit 34 based on the detection amount distribution of a plurality of the energy rays acquired for each of the plurality of different positional relationships. As a result, a calculation accuracy of the positional relationship between the X-ray source 2 and the object to be measured 500 for causing the X-rays to be propagated along the boundary surface 503 of the winding frame 501 can be improved.

The first embodiment described above can be modified as follows.

Variation 1

In the embodiment described above, an example is given of a case in which the placement table 31 is movable along the Y axis direction, but the present invention is not limited to this example. For example, the placement table 31 can be configured, for example, by a gonio stage or the like, and can be configured so as to be rotatable in the YZ plane around an inclined axis Xr (an axis parallel to the X axis, for example) intersecting with the Z axis, which is the propagation direction of the X-rays. In this case also, the manipulator control unit 52 of the X-ray device 100 sets the relative positions of the X-ray source 2 and the object to be measured 500 so that the detector 4 detects only the object to be wound 502 of the object to be measured 500.

FIG. 7 schematically exemplifies a positional relationship between the object to be measured 500 and the X-ray source 2. FIG. 7($a$) schematically illustrates a case in which the optical axis Za of the X-rays from the X-ray source 2 passes through the winding frame 501 in the same manner as in FIG. 3($a$), and FIG. 7($b$) schematically illustrates a state in which the placement table 31 is displaced and the object to be measured 500 is rotated from the state illustrated in FIG. 7($a$). In this case, the manipulator control unit 52 calculates an angle θ formed by the energy ray and the optical axis Za of the X-rays, based on the distance FID from the X-ray source 2 to the detector 4 and the position Y on the detector 4 on which the X-ray enters. The manipulator control unit 52 rotationally drives the placement table 31 around the inclined axis Xr by the angle θ. In other words, in a position to which the placement table 31 is rotationally driven at the angle θ, the X-ray source 2 and the object to be measured 500 have the target positional relationship. As a result, the placement table 31 is displaced around the inclined axis Xr extending in a direction intersecting the propagation direction of the energy rays, and the positional relationship can be changed such that the boundary surface 503 of the winding frame 501 of the object to be measured 500 is disposed along the propagation direction of the energy rays.

Variation 2

It is preferable that the positional relationships of the X-ray source 2, the object to be measured 500 and the detector 4 be set such that an energy ray of a peripheral edge portion of the X-ray, which is a diffused energy ray propagated from the X-ray source 2, is propagated along the boundary surface 503 between the winding frame 501 of the object to be measured 500 and the object to be wound 502, and reaches an edge of a detection region of the incident surface 41 on the detector 4.

FIG. 8($a$) schematically illustrates the incident surface 41 on the detector 4 and a detection region 42 for detecting the X-rays from the X-ray source 2. In an example illustrated in FIG. 8($a$), the detection region 42 is provided, for example, as a rectangular region on the incident surface 41 of the detector 4, an electronic signal is output from the detector 4 based on the intensity of the X-rays incident on the detection region 42, and the internal image is generated.

FIG. 8($b$) is a diagram schematically illustrating positional relationships of the X-ray source 2, the object to be measured 500 and the detector 4 in variation 2. In FIG. 8($b$), the positional relationship between the X-ray source 2 and the detector 4 is set so that an energy ray Le of the peripheral edge portion of the X-ray from the X-ray source 2 reaches an edge on the positive Y direction side of the detection region 42 of the detector 4. In this state, the positional relationship between the X-ray source 2 and the object to be measured 500 is set using the above-described method of the first embodiment so that the energy ray Le is propagated along the boundary surface 503 of the winding frame 501 of the object to be measured 500. In this way, since the X-rays that have passed through the object to be wound 502 of the object to be measured 500 can reach the detection region 42 of the detector 4, the detection region 42 of the detector 4 can be effectively used to generate the internal image of the object to be wound 502.

Note that the present invention is not limited to this example in which the energy ray Le of the peripheral edge portion of the X-ray reach the edge of the detection region 42 of the detector 4. The positional relationships may also be set such that the energy ray, which is not of the peripheral edge portion of the X-ray, propagated along the boundary surface 503 of the winding frame 501 of the object to be measured 500, reaches the edge of the detection region 42 of the detector 4. In this case, since the energy ray that has passed through the winding frame 501 does not reach the detection region 42 of the detector 4, a projection image of the winding frame 501 is not included in the internal image. Therefore, the detection region 42 of the detector 4 can be effectively used to generate the internal image of the object to be wound 502.

Note that, in the embodiment described above, an example is given of the X-ray device 100 in which the X-ray source 2, the placement unit 3, and the detector 4 are arranged parallel to the floor surface of the factory or the like, but the present invention is not limited to this example. For example, the X-ray source 2, the placement unit 3, and the detector 4 may be placed in a vertical direction with respect to the floor surface of the factory or the like. In this case, the placement unit 3 may be disposed between the X-ray source 2 and the detector 4. In this case, the X-ray source 2 may be disposed on a side closer to the floor, or the detector 4 may be disposed on the side closer to the floor. In JP 2015-083932 A, an example of such an arrangement of the X-ray source 2, the placement unit 3, and the detector 4 is disclosed.

Second Embodiment

A production system of an object to be wound according to an embodiment of the present invention will be described with reference to the drawings. The production system of the object to be wound according to the present embodiment produces a molded product configured, for example, by the winding frame and the object to be wound that are described in the first embodiment.

Figure 9:
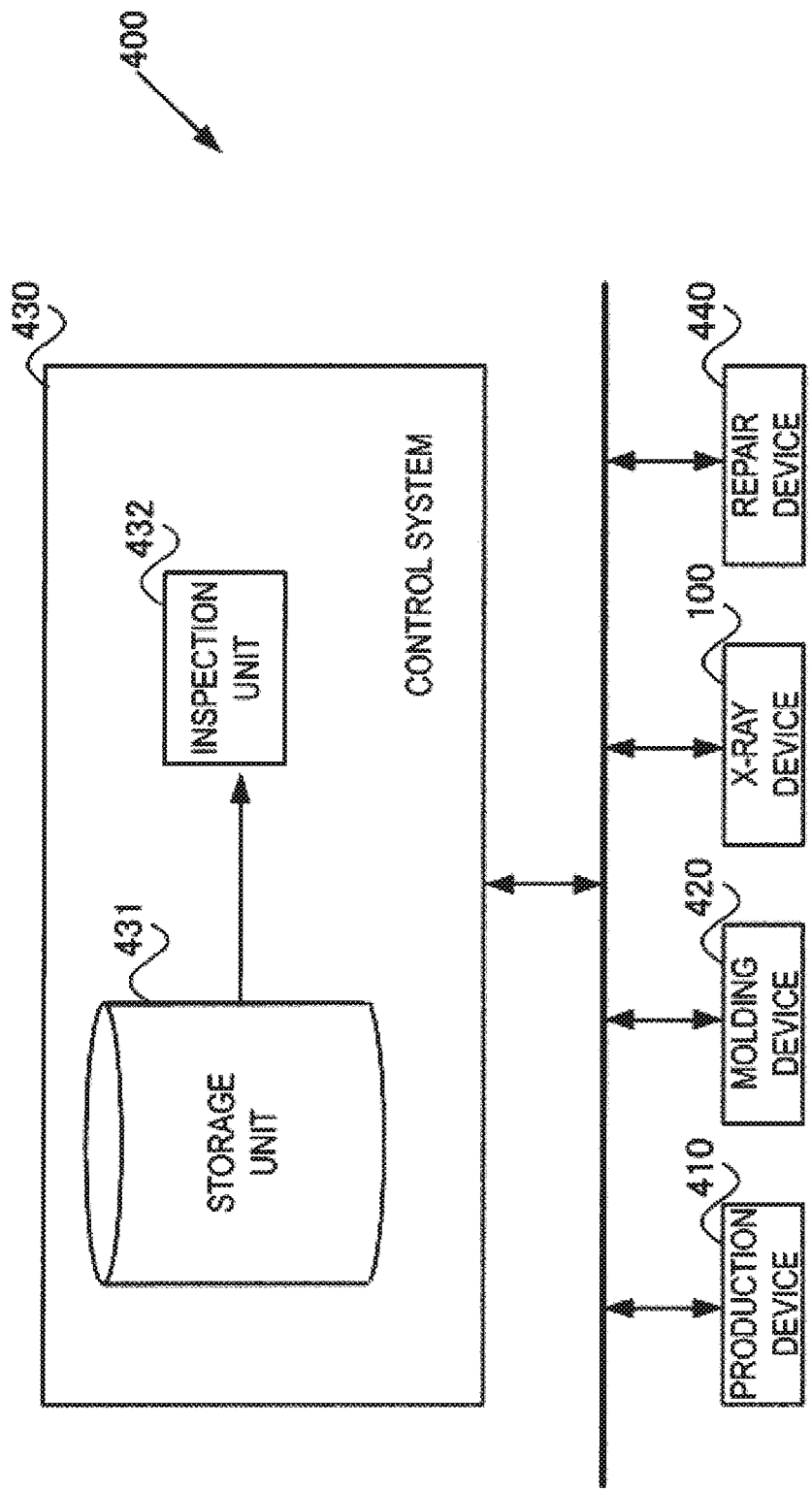
FIG. 9 A block diagram schematically illustrating a configuration of main components of a production system according to a second embodiment.

FIG. 9 is a block diagram illustrating an example of a configuration of a production system 400 according to the present embodiment. The production system 400 is provided with the X-ray device 100 described in the first embodiment and each of the variations, a production device 410, a molding device 420, a control system 430, and a repair device 440.

The production device 410 performs production processing for producing the object to be wound that is to be wound around the winding frame based on design information or the like. The molding device 420 performs molding processing for producing the molded product by winding the object to be wound produced by the production device 410 around the winding frame.

The X-ray device 100 performs measurement processing for measuring the shape of the molded product molded by the molding device 420. The X-ray device 100 generates an internal image representing internal information of the molded product, which is a measurement result obtained by measuring the molded product, and outputs the internal image to the control system 430. The control system 430 is provided with a storage unit 431 and an inspection unit 432. An internal image of a non-defective molded product is stored in advance in the storage unit 431 as a reference image.

The inspection unit 432 determines whether the molded product molded by the molding device 420 has been molded according to the design information. In other words, the inspection unit 432 determines whether the molded product is the non-defective product. In this case, the inspection unit 432 reads the reference image stored in the storage unit 431 and performs inspection processing to compare the internal image generated by the X-ray device 100 with the reference image. The inspection unit 432 compares coordinates of the molded product in the reference image with corresponding coordinates of the molded product in the internal image, and when the coordinates of the molded product on the reference image and the coordinates of the molded product on the internal image match each other, the inspection unit 432 determines that the molded product is the non-defective product that has been molded according to the design information. When the coordinates of the molded product on the reference image and the corresponding coordinates of the molded product in the internal image do not match each other, the inspection unit 432 determines whether a difference between the coordinates is within a predetermined range, and when the difference is within the predetermined range, determines that the molded product is a repairable defective product.

Note that the reference image and the internal image are not limited to the projection image, the three-dimensional data, or the tomographic image data, and may be, for example, an overhead image representing an external appearance of the object to be measured 500, or profile information about a distribution of pixel values. The profile information about the distribution of the pixel values is a graph in which the horizontal axis is set as position information of the object to be measured 500, for example, and the vertical axis is set as information on the pixel values such as the luminance values, for example. When a plurality of extreme values appear on the graph, which is the profile information on the distribution of the pixel values, the inspection unit 432 may determine that the molded product is a defective product, and when one or less of the extreme value appears on the graph, the inspection unit 432 may determine that the molded product is the non-defective product. Furthermore, the determination on the non-defective or defective product may be performed based on threshold information indicating an upper limit value or a lower limit value that indicate a non-defective product range, instead of the reference image.

When it is determined that the molded product is a repairable defective product, the inspection unit 432 outputs, to the repair device 440, repair information indicating a defective area and a repair amount. The defective area is coordinates of the molded product on the internal image that do not match the coordinates of the molded product on the reference image, and the repair amount is the difference between the coordinates of the molded product on the reference image and the coordinates of the molded product on the internal image, in the defective area. The repair device 440 performs repair processing for reprocessing the defective area of the molded product based on the input repair information. In the repair processing, the repair device 440 performs processing for removing a defect that is the defective area in the molded product.

Figure 10:
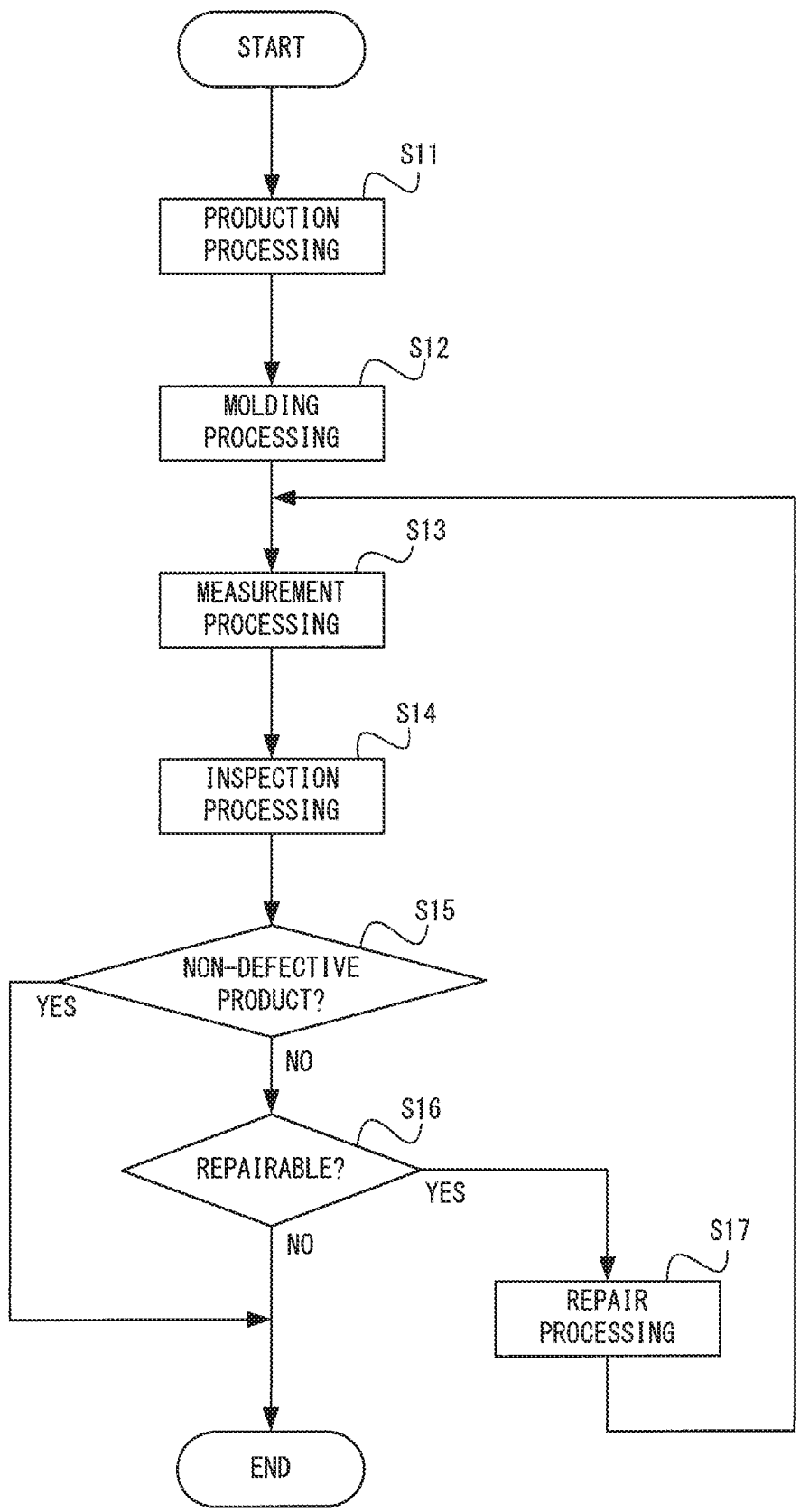
FIG. 10 A flowchart describing operations of the production system according to the second embodiment

Processing performed by the production system 400 will be described with reference to a flowchart illustrated in FIG. 10.

At step S11, the production device 410 performs the production processing for producing the object to be wound, and the flow proceeds to step S12. At step S12, the molding device 420 performs the molding processing for producing the molded product by performing winding processing in which the produced object to be wound is wound around the winding frame, and the flow proceeds to step S13. At step S13, the X-ray device 100 performs the measurement processing for measuring the shape of the molded product and outputs the internal image. Then, the flow proceeds to step S14.

At step S14, the inspection unit 432 performs the inspection processing for comparing the reference image stored in the storage unit 431 with the internal image measured and output by the X-ray device 100, and the flow proceeds to step S15. At step S15, based on the result of the inspection processing, the inspection unit 432 determines whether the molded product molded by the molding device 420 is the non-defective product. When the molded product is the non-defective product, that is, when the coordinates of the molded product in the reference image and the coordinates of the molded product in the internal image match each other, an affirmative determination is made at step S15, and the processing ends. When the molded product is not the non-defective product, that is, when the coordinates of the molded product in the reference image and the coordinates of the molded product in the internal image do not match each other, a negative determination is made at step S15, and the flow proceeds to step S16.

At step S16, the inspection unit 432 determines whether the defective area of the molded product is repairable. When the defective area is not repairable, that is, when the difference between the coordinates of the molded product in the reference image and the coordinates of the molded product in the internal image exceeds the predetermined range, a negative determination is made at step S16, and the flow ends. When the defective area is repairable, that is, when the difference between the coordinates of the molded product in the reference image and the coordinates of the molded product in the internal image is within the predetermined range, an affirmative determination is made at step S16, and the flow proceeds to step S17. In this case, the inspection unit 432 outputs the repair information to the repair device 440. At step S17, the repair device 440 performs the repair processing on the molded product based on the input repair information, and the processing then returns to step S13.

In the production system 400 according to the second embodiment described above, the following effects are obtained.

(1) The X-ray device 100 performs the measurement processing for acquiring the internal image of the molded product produced by the production device 410 and the molding device 420, and the inspection unit 432 of the control system 430 performs the inspection processing for comparing the internal image acquired in the measurement processing with the reference image stored in the storage unit 431. Therefore, information regarding the inspection of the defect in the molded product or the inside of the molded product can be acquired by a non-destructive inspection, and it can be determined whether the molded product is the non-defective product that has been produced according to the design information. This contributes to quality management of the molded product.

(2) The repair device 440 performs the repair processing, on the basis of the comparison result of the inspection processing, for removing the defective area of the object to be wound identified based on the internal image. Therefore, when a defective portion of the molded product is repairable, the defective area can be removed, thus contributing to producing the molded product of a high quality close to the design information.

Variations such as those below are also within the scope of the present invention, and it is also possible to combine one variation or a plurality of the variations with the embodiment described above.

With respect to the X-ray device 100 of the first and second embodiments described above, an example is described of a case in which the placement table 31 on which the object to be measured 500 is placed is moved in the X axis, the Y axis, and the Z axis directions by the Y axis movement unit 34, the X axis movement unit 33, and the Z axis movement unit 35. However, the present invention is not limited to this example. The placement table 31 need not necessarily be moved in the X axis, the Y axis, and the Z axis directions, and the X-ray source 2 and the detector 4 may be moved relative to an object to be measured S by moving the X-ray source 2 and the detector 4 in the X axis, the Y axis, and the Z axis directions.

Furthermore, the X-ray device 100 of the first and second embodiments described above may include a ray source that irradiates gamma rays, neutron rays, and the like as energy rays, instead of the X-ray source 2 that irradiates the X-rays as the energy rays.

The present invention is not limited to the embodiments described above, and various modifications may be made without departing from the spirit of the present invention. Other embodiments that embody the technical concepts of the present invention are also included within the scope of the present invention.

REFERENCE SIGNS LIST

2 X-ray source
3 Placement unit
4 Detector
5 Control device
31 Placement table
32 Rotation drive unit
33 X axis movement unit
34 Y axis movement unit
35 Z axis movement unit
36 Manipulator unit
51 X-ray control unit
52 Manipulator control unit
53 Image generation unit
54 Image reconstruction unit
100 X-ray device
400 Production system
410 Production device
420 Molding device
430 Control system
431 Storage unit
432 Inspection unit
440 Repair device
500 Object to be inspected
501 Winding frame
502 Object to be wound
503 Boundary surface

The invention claimed is:

1. An inspection device comprising:
a ray source that irradiates an object to be inspected with an energy ray, the object including a first member and a second member and a boundary extending between the first member and the second member;
a detection unit that detects an energy ray having passed through the object to be inspected;
a displacement mechanism that sets a relative position of the object to be inspected and the ray source by displacing at least one of the object to be inspected and the ray source in relation to the other of the object to be inspected and the ray source;
an internal image generation unit that generates an internal image of the object to be inspected based on a detection amount distribution of the energy ray detected by the detection unit; and
a control unit that controls the displacement mechanism based on a position of the boundary acquired from the detection amount distribution of the energy ray through the boundary of the object detected by the detection unit, wherein the control unit controls the displacement mechanism so as to obtain a positional relationship in which part of the energy ray from the ray source is propagated along the boundary between the first member and the second member configuring the object to be inspected, the second member having a different absorption coefficient from the first member with respect to the energy ray.

2. The inspection device according to claim 1, wherein the control unit controls the displacement mechanism so as to obtain a positional relationship in which only the first member of the object to be inspected is detected, the first member is configured by the first member and the second member having a different absorption coefficient from the first member with respect to the energy ray.

3. The inspection device according to claim 2, wherein the displacement mechanism displaces, in a direction intersecting a propagation direction of the energy ray, at least one of the ray source and a placement surface of a placement table on which the object to be inspected is placed in relation to the detection unit.

4. The inspection device according to claim 3, wherein the displacement mechanism includes an inclined axis extending in the direction intersecting the propagation direction of the energy ray, and displaces the placement table around the inclined axis to change an angle formed between the placement surface of the placement table and the propagation direction of the energy ray.

5. The inspection device according to claim 3, wherein the control unit acquires the detection amount distribution of the energy ray for each of a plurality of different positional relationships between the placement table and the detection unit, and controls the displacement mechanism based on a plurality of the detection amount distributions acquired for each of the plurality of different positional relationships.

6. The inspection device according to claim 2, wherein the first member is a winding frame, and the second member is an object to be wound that is wound around the winding frame.

7. The inspection device according to claim 1, wherein the control unit controls the displacement mechanism based on the detection amount distribution of the energy ray propagated at or near a boundary section between the first member and the second member.

8. The inspection device according to claim 1, wherein the energy ray is a radiation energy ray propagated radially from the ray source,
an energy ray at a peripheral portion of the radiation energy ray is an energy ray that reaches an edge of the detection unit, and
the control unit controls the displacement mechanism so that the energy ray at the peripheral portion of the radiation energy ray is propagated along a boundary surface between the first member and the second member.

9. A method for producing an object to be inspected, the method comprising:
acquiring an internal image using the inspection device according to claim 1; and
comparing the internal image with an image of a reference object.

10. The method for producing the object to be inspected according to claim 9, the method further comprising:
reprocessing the object to be inspected based on a comparison result between the internal image and the image of the reference object.

11. The method for producing the object to be inspected according to claim 10, wherein
in the reprocessing of the object to be inspected, a defective area of the object to be inspected is removed based on the internal image.

12. An inspection method comprising:
irradiating an object to be inspected with an energy ray from a ray source;
detecting an energy ray having passed through the object to be inspected using a detection unit, the object including a first member and a second member and a boundary extending between the first member and the second member;
setting a relative position of the object to be inspected and the ray source by displacing at least one of the object to be inspected and the ray source in relation to the other of the object to be inspected and the ray source, using a displacement mechanism;
generating an internal image of the object to be inspected based on a detection amount distribution of the energy ray detected by the detection unit;
controlling the displacement mechanism based on a position of the boundary acquired from the detection amount distribution of the energy ray through the boundary of the object detected by the detection unit; and
controlling the displacement mechanism so as to obtain a positional relationship in which part of the energy ray from the ray source is propagated along the boundary between the first member and the second member configuring the object to be inspected, the second member having a different absorption coefficient from the first member with respect to the energy ray.

13. The inspection method according to claim 12, further comprising:
controlling the displacement mechanism so as to obtain a positional relationship in which only the first member of the object to be inspected is detected, the first member is configured by the first member and the second member having a different absorption coefficient from the first member with respect to the energy ray.

14. The inspection method according to claim 13, wherein the displacement mechanism displaces, in a direction intersecting a propagation direction of the energy ray, at least one of the ray source and a placement surface of a placement table on which the object to be inspected is placed in relation to the detection unit.

15. The inspection method according to claim 14, wherein the displacement mechanism includes an inclined axis extending in the direction intersecting the propagation direction of the energy ray, and displaces the placement table around the inclined axis to change an angle formed between the placement surface of the placement table and the propagation direction of the energy ray.

16. The inspection method according to claim 14, further comprising:
acquiring the detection amount distribution of the energy ray for each of a plurality of different positional relationships between the placement table and the detection unit; and
controlling the displacement mechanism based on a plurality of the detection amount distributions acquired for each of the plurality of different positional relationships.

17. The inspection method according to claim 13, wherein the first member is a winding frame, and the second member is an object to be wound that is wound around the winding frame.

18. The inspection method according to claim 12, further comprising:
controlling the displacement mechanism based on the detection amount distribution of the energy ray propagated at or near a boundary section between the first member and the second member.

19. The inspection method according to claim 12, wherein:
- the energy ray is a radiation energy ray propagated radially from the ray source, and
- an energy ray at a peripheral portion of the radiation energy ray is an energy ray that reaches an edge of the detection unit, and
- the inspection method further comprising
- controlling the displacement mechanism so that the energy ray at the peripheral portion of the radiation energy ray is propagated along a boundary surface between the first member and the second member.

\* \* \* \* \*